United States Patent [19]
de la Broise

[11] Patent Number: 5,028,096
[45] Date of Patent: Jul. 2, 1991

[54] HYDRAULIC BRAKE CIRCUIT FOR A MOTOR VEHICLE EQUIPPED WITH AN ANTI-LOCK DEVICE AND WITH AN ANTI-SKID DEVICE FOR WHEELS

[75] Inventor: Marc de la Broise, Bagneux, France

[73] Assignee: Bendix France, Drancy, France

[21] Appl. No.: 452,940

[22] Filed: Dec. 19, 1989

[30] Foreign Application Priority Data

Dec. 28, 1988 [FR] France ............... 88 17299

[51] Int. Cl.5 .................................. B60T 8/48
[52] U.S. Cl. .................................. 303/119; 303/116
[58] Field of Search ............... 303/119, 116, 113, 110, 303/DIG. 1, DIG. 2, 115, 97; 180/195

[56] References Cited

U.S. PATENT DOCUMENTS

| | | | |
|---|---|---|---|
| 3,866,983 | 2/1975 | Kondo | 303/119 |
| 4,509,802 | 4/1985 | Solleder et al. | 303/97 |
| 4,944,565 | 7/1990 | Gilbert | 303/110 |
| 4,962,975 | 10/1990 | Kervagoret | 303/116 |

FOREIGN PATENT DOCUMENTS

| | | |
|---|---|---|
| 3137286 | 10/1985 | Fed. Rep. of Germany. |
| 2611630 | 9/1988 | France. |
| 2632913 | 9/1990 | France. |
| 2119883 | 11/1983 | United Kingdom. |

Primary Examiner—Matthew C. Graham
Attorney, Agent, or Firm—Larry J. Palguta; Ken C. Decker

[57] ABSTRACT

The circuit comprises a first branch (35, 20, 21) and second branch (5, 8, 9) respectively controlling the feeding of brake fluid to a driving-wheel brake (100) and a non-driving wheel brake (101). An anti-lock device controls solenoid relief valves (21, 9) which interact with pilot-controlled valves (20, 8). A solenoid anti-skid valve (35) is connected to the first branch, downstream of the junction point (6) of the two branches with the master cylinder (1) in order to ensure the possibility of braking the non-driving wheel by way of the brake pedal (3) simultaneously with an anti-skid sequence or with an accidental triggering of the solenoid valve (35).

8 Claims, 1 Drawing Sheet

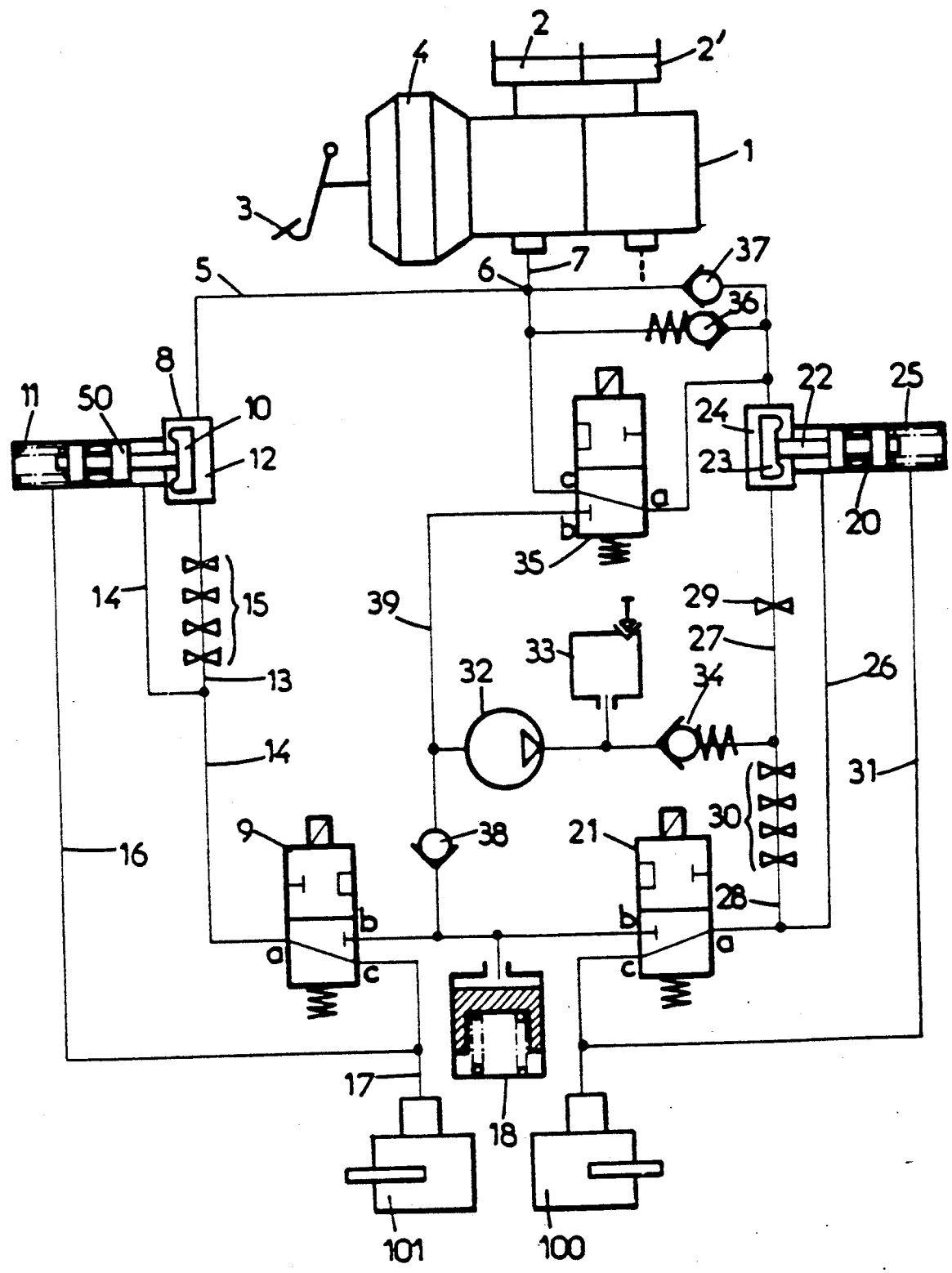

HYDRAULIC BRAKE CIRCUIT FOR A MOTOR VEHICLE EQUIPPED WITH AN ANTI-LOCK DEVICE AND WITH AN ANTI-SKID DEVICE FOR WHEELS

BACKGROUND OF THE INVENTION

The present invention relates to a hydraulic brake circuit for a motor vehicle and more particularly to such a circuit equipped with an anti-lock device and with an anti-skid device for the wheels of the vehicle.

The locking of the wheels is a phenomenon which occurs during braking, when the brake force exerted on a wheel causes the wheel to slip on the road. The word "skidding" is used when, in the absence of any braking, a driving wheel slips on the road because the engine torque driving it exceeds the reaction torque attributable to the friction at the wheel/road interface. In both cases, the steering of the vehicle becomes difficult and even impossible to control because of the loss of grip of the wheels.

To guard against this dangerous situation, devices were designed which detect the imminent occurrence of the locking of a wheel and which, in response, correct the pressure of the brake fluid in the wheel brake by means of successive cycles of expansion and compression, until the risk of slipping of the wheel has disappeared.

Devices were also designed which detect imminent skidding and, in response, brake the wheel in such a way as to reduce the resulting engine torque received by the wheel and thus prevent the latter from slipping on the road.

U.S. Pat. No. 4,944,565 which is now U.S. Pat. No. 4,964,565, assigned to the present assignee and entitled "Hydraulic brake circuit for a motor vehicle equipped with wheel anti-lock and anti-skid devices", describes a brake circuit which comprises a master cylinder controlled by a solenoid relief valve, by means of which the master cylinder normally communicates with the brake, an actuation of this solenoid valve under the control of the anti-lock device putting the brake in communication with brake-fluid storage means, and a pump, of which an actuation controlled by the anti-lock device causes the brake fluid to be delivered from the storage means to the brake, via the solenoid relief valve, when the latter is not actuated. The circuit also comprises a solenoid anti-skid valve which is placed upstream of the solenoid relief valve and by means of which the master cylinder normally communicates with the brake, an actuation of the solenoid anti-skid valve under the control of the anti-skid device putting the master cylinder in communication with a suction port of the pump, the actuation of which is likewise controlled by the anti-skid device.

When the wheel anti-skid device detects the imminent slipping of a wheel, the solenoid anti-skid valve is energized and the pump is actuated. The master cylinder then communicates with the brakes of the vehicle via the pump. On the assumption that the brake pedal is not actuated, the brake fluid contained in the reservoir of the master cylinder is then sucked up by the pump and delivered to the brakes, so that an action to brake the wheels is exerted automatically until the risk of slipping of the latter has disappeared.

In the described use for an "X"-type brake circuit with two independent circuits, each controlling a front-wheel brake and a rear-wheel brake respectively, it is clear that the solenoid anti-skid valve of the abovedescribed circuit is placed upstream of the feed lines of the two brakes. In the anti-skid phase, therefore, no action on the two brakes is possible from the brake pedal.

However, the driver may have to actuate this if the solenoid anti-skid valve has been triggered accidentally or even if the latter is actuated normally in order to prevent imminent skidding. Action on the brake pedal may in any case be justified for safety reasons, in order to brake a non-driving wheel while the driving wheel is assumed to be braked by means of the anti-skid device.

Under these two circumstances, with the circuit of the abovementioned patent application, the braking action on the non-driving wheel will be delayed considerably because of an absorption of brake fluid by the storage means of this fluid which are put in communication with the master cylinder during an anti-skid period.

SUMMARY OF THE INVENTION

An object of the present invention is, therefore, to provide a hydraulic brake circuit for a motor vehicle, equipped with an anti-lock device and with an anti-skid device for wheels, which does not have this disadvantage.

Another object of the present invention is to provide such a circuit which, used for braking a driving wheel and a non-driving wheel in the crossed position, permanently allows the non-driving wheel to be braked from the brake pedal, whether the solenoid anti-skid valve is actuated or not.

These objects of the invention and others emerging from the rest of the present description are achieved by means of a hydraulic brake circuit for a motor vehicle, equipped with an anti-lock device and with an anti-skid device for wheels, this circuit comprising a master cylinder controlled by a brake pedal, first and second branches connected to the master cylinder for feeding brake fluid to the first and second brakes associated respectively with a driving wheel and with a free wheel, each branch comprising a solenoid relief valve, by means of which the master cylinder normally communicates with the associated brake, an actuation of this solenoid valve under the control of the anti-lock device putting the brake in communication with brake-fluid storage means, and a pump actuated selectively by means of the anti-lock device in order to deliver brake fluid to the brakes, this circuit also comprising a solenoid anti-skid valve, being placed downstream of the junction point of the two branches of the circuit with the master cylinder, in the branch for feeding the driving-wheel brake and upstream of the solenoid relief valve, in order, at rest, to establish communication between the master cylinder and the driving-wheel brake via this solenoid relief valve, upon the detection of imminent skidding of the driving wheel the anti-skid device actuating the pump and the solenoid anti-skid valve in order to break this communication and connect the inlet of the pump to the master cylinder, in such a way that the pump delivers brake fluid coming from the latter to the driving-wheel brake via the associated solenoid relief valve, so as to brake the driving wheel until the risk of slipping of the wheel has disappeared.

A non-return valve is placed between the inlet of the pump and the storage means, to prevent these means from being filled with brake fluid coming from the master cylinder, in the event of braking controlled by the brake pedal simultaneously with the functioning of the anti-skid device or with an accidental triggering of the solenoid anti-skid valve.

It will emerge from the rest of the present description that the position selected for the solenoid anti-skid valve in the circuit according to the invention makes it possible to exert a braking action on the non-driving wheel permanently, whether the solenoid anti-skid valve is actuated or not, thus improving the safety of the vehicle equipped with this circuit.

BRIEF DESCRIPTION OF THE DRAWING

In the accompanying drawing given purely by way of example, the single FIGURE is a diagram of a preferred embodiment of the hydraulic brake circuit according to the present invention, used on a front-wheel drive vehicle.

DETAILED DESCRIPTION OF THE INVENTION

It is clear from this FIGURE that the circuit according to the invention is connected in a conventional way to a "tandem" master cylinder 1 fed by brake-fluid reservoirs 2, 2' and controlled by a brake pedal 3, if appropriate via a brake booster 4.

According to a preferred embodiment of the invention, the complete brake circuit for a four-wheel vehicle comprises two identical circuits, each connected to one of the two control chambers of the tandem cylinder 1. The drawing shows only one of these two circuits, which is designed for controlling a wheel brake 100 associated with a right front driving wheel and a wheel brake 101 associated with a left rear non-driving wheel. The circuit illustrated comprises a first branch intended for feeding the brake 100 and a second branch for feeding the brake 101. This second branch comprises a line 5 which starts from a junction point 6 with a line 7 connected to the master cylinder 1, this line 5 serving for feeding the brake 101 directly from the master cylinder, via a pilot-controlled valve 8 and a three-way two-position solenoid relief valve 9. A brake circuit with an anti-lock device of this type is described in FR-A-2,611,630 which corresponds to U.S. Pat. No. 4,962,975 (a continuation of U.S. Ser. No. 339,909 filed on Apr. 17, 1989 U.S. Ser. No. 159,620 filed Feb. 23, 1988; both now abandoned).

The pilot-controlled valve 8 comprises a valve 50, the head 10 of which is loaded into an opening position by a spring 11 acting on the valve end opposite that carrying the head 10. The master cylinder 1 is connected, via the line 5, to a chamber 12 of the valve 8 which surrounds the valve head 10. The valve head 10 is interposed between two parts of the chamber 12 which are connected respectively to lines 13 and 14. The line 13 has a plurality of restrictions 15, while the line 14 short-circuits these restrictions, the function of which will be explained later.

The line 14 is connected to the orifice a of the solenoid valve 9. The spring 11 loading the valve 50 of the pilot-controlled valve is placed in a chamber connected to the feed line 17 of the brake 101 by means of a line 16, these two lines being connected to the orifice c of the solenoid valve 9. The orifice b of the solenoid valve is connected to a low-pressure brake-fluid accumulator 18. When the solenoid valve 9 is in its rest position, the orifice b is closed off, while the orifices a and c communicate in order to make a connection between the lines 14 and 17. When the winding of the solenoid valve is energized by an electrical current, the orifice a is isolated and the orifices b and c communicate, thus causing the expansion of the fluid contained in the brake 101 during an anti-lock sequence.

Similarly, the first branch of the circuit feeds the brake 100 via a pilot-controlled valve 20 and a three-way two-position solenoid relief valve 21. The pilot-controlled valve 20 comprises a valve 22, the head 23 of which is placed in a chamber 24, this valve being loaded into the opening position by a spring 25. In the closing position, the valve head 23 divides the chamber 24 into two compartments which are connected to the orifice a of the solenoid relief valve 21 by means of a line 26 and lines 27, 28 respectively. The line 26 short-circuits restrictions 29, 30 arranged respectively in the lines 27 and 28. The chamber of the pilot-controlled valve 20 in which the spring 25 is located is connected to the inlet of the brake 100 and to the orifice c of the solenoid valve 21 by means of a line 31. The orifice b of the solenoid valve 21 is connected to the accumulator 18, as with the orifice b of the solenoid valve 9.

As in the brake circuit described in afore-mentioned FR-A-2,611,630, in the circuit according to the present invention there is also a pump 32 mounted between the low-pressure accumulator 18 and a high-pressure accumulator 33, in order to deliver brake fluid to the brakes during the functioning of the wheel anti-lock device, as will be seen later. A calibrated non-return valve 34 prevents a return flow of brake fluid into the outlet orifice of the pump. The high-pressure accumulator 33 absorbs pressure fluctuations during the functioning of the anti-lock device.

The circuit also comprises a three-way two-position solenoid anti-skid valve 35. According to an important feature of the present invention, the significance of which will be explained later, this solenoid valve is arranged in the first branch of the circuit downstream of the junction point 6. In the rest position shown in the figure, the solenoid valve 35 puts in communication its orifice c connected to the junction point 6 with its orifice a connected to the chamber 24 of the pilot-controlled valve 20, the orifice b connected to the pump inlet then being isolated. When this solenoid valve 35 assumes its second position as a result of the flow of a current through its winding, the orifices b and c communicate with one another, while the orifice a is isolated. In this second position, the master cylinder is put in communication with the pump 32, the orifice b being connected to the inlet of the latter by means of a line 39.

The circuit according to the invention also comprises several non-return valves in addition to the valve 34 already mentioned. A calibrated non-return valve 36 is placed between the orifice c of the solenoid valve 35 and the chamber 24 of the valve 20, in order to limit the difference between the inlet and outlet pressures of the pump 32 when, with the solenoid valve 35 energized, the latter delivers brake fluid to the circuit according to the invention. According to a feature of the circuit according to the invention, another non-return valve 37 is mounted between the junction point 6 and the chamber 24 of the pilot-controlled valve 20, in order to allow the brake fluid to circulate from this junction point 6 towards this chamber. If the solenoid valve 35 is energized accidentally, pressure on the brake pedal thus makes it possible to convey a fluid under pressure into the first branch of the circuit, that is to say towards the brake 100, via the non-return valve 37. There is therefore still the possibility of braking the right front wheel, even if the solenoid valve 35 is energized accidentally, thus improving the operating safety of the circuit.

According to another feature of the circuit according to the invention, a non-return valve 38 is arranged between the inlet of the pump 32 and that of the accumulator 18 for a purpose which will be explained later.

The above-described brake circuit is, of course, associated with a wheel anti-lock device which comprises a computer controlled by signals coming from vehicle-wheel speed sensors, in order to control the beating of the solenoid valves 9 and 21 when an imminent condition of locking of either one of the wheels associated with these solenoid valves is detected by these sensors. Likewise, the circuit is associated with an anti-skid device comprising a computer which can be supplied with signals coming from the same wheel-speed sensors, in order to command the energization of the solenoid valve 35 and the beating of the solenoid valves 9 and 21 when an imminent condition of skidding of the right front driving wheel is detected. Of course, one and the same computer could be used in these two devices. These sensors and computers (not shown) are used conventionally for controlling brake circuits of the above-described type and will not be described in more detail.

When there is no action by the anti-lock and anti-skid devices, the above-described brake circuit functions in the conventional way, when the driver presses on the brake pedal, by raising the pressure of the fluid in the brake 100 via the open valve 20 and the solenoid valve 21 at rest and in the brake 101 via the valve 8 and the solenoid valve 9.

The functioning of the circuit according to the present invention will now be described in three different specific situations, namely a first situation corresponding to the functioning of the anti-lock device, a second situation corresponding to the functioning of the anti-skid device, and a third situation corresponding to a braking action caused by the driver by means of the brake pedal when the solenoid anti-skid valve is energized accidentally.

When, during a braking period, the anti-lock device takes effect to prevent an imminent loss of grip of a wheel of the vehicle, the solenoid anti-skid valve 35 remains at rest in the position shown in the FIGURE. The braking period begins with an action by the driver on the brake pedal 3, this action being amplified by the brake booster 4 which increases the pressure in the line 7 connected to the master cylinder, this pressure being transmitted to the brake 100 via the pilot-controlled valve 20 and the solenoid valve 21. When the anti-lock device detects the imminent slipping of the right front wheel, for example, it commands the energization of the solenoid valve 21 in order to break communication between the orifices a and c of this solenoid valve and put the orifice c and the orifice b in communication with one another, so as to allow the expansion of the brake fluid which is contained in the brake 100 and which drains into the accumulator 18. This expansion has an effect in the line 31 and the chamber of the valve 20 containing the spring 25 and causes this valve to close, thus isolating the line 26. The fluid recovered by the accumulator is sucked up by the pump 32 started up simultaneously by means of the computer of the anti-lock device, this pump delivering the fluid under pressure to the solenoid valve 21, the orifice a of which is then closed. The computer subsequently commands an increase of pressure of the brake fluid in the brake 100 via the restrictions 29 and 30 which slow this increase, the solenoid valve 21 once again being put briefly into the rest position by means of the computer, in order to restore communication between the orifices a and c. A new expansion controlled by the computer leaves the valve 20 closed because it is of the pressure-confirmation type. Subsequent pressure increases controlled by the computer then take place via the restrictions 30 which slow these increases, as described above. This produces expansion cycles followed by a slow pressure increase, these cycles linking up so as to establish a sawtooth-shaped pressure increase, until the risk of slipping of the wheel is eliminated.

The anti-lock device causes the second branch of the circuit feeding the wheel brake 101 to function in a similar way, when the imminent locking of the left rear wheel is detected. In order to obtain an expansion of the fluid contained in the brake 101, the device then commands the energization of the solenoid valve 9 so as to put in communication the line 17 and the accumulator 18 which fills with fluid, this being taken up by the pump 32 which conveys the fluid under pressure via the solenoid valve 35 towards the pilot-controlled valve 8 and the solenoid valve 9 then closed. A slow pressure increase can subsequently be controlled, as described above, as a result of the passage of the brake fluid through the restrictions 15 placed in series with the chamber 12 of the pilot-controlled valve 8. This operating mode is conventional, and there is no need to describe it in more detail, the more so because it does not form part of the invention.

It will be seen that there is the restriction 29 between the nonreturn valve 34 and the chamber 24 of the pilot-controlled valve 20, for the purpose of filtering reactions which are transmitted to the brake pedal via the master cylinder and the brake booster 4 during the functioning of the circuit in the anti-lock mode. In fact, the successive expansion cycles followed by a slow pressure increase which are established in the right front brake during periods of operation of the anti-lock device are converted into mechanical vibrations on the brake pedal 3, which vibrations are unpleasant for the driver. The restriction 29 substantially diminishes the amplitude of these vibrations.

The functioning of the brake circuit according to the invention when the anti-skid device takes effect will now be examined. As seen above, such a device must be capable of detecting the imminent skidding of a wheel of the vehicle, the engine torque exerted on this wheel then being responsible for this situation, as, for example, during the starting of a vehicle on ground covered with gravel, if the driver accelerates a little too sharply. The anti-skid device receives from the wheel-speed sensors signals which are analysed in its computer in order to detect the imminent skidding of the driving wheel associated with the brake 100. The computer then commands the energization of the solenoid valve 35 which thereby changes to the position in which it puts the orifices b and c in communication, while closing the orifice a. Thus, the pump 32 likewise started up by means of the computer can suck up fluid coming from the master cylinder, via the solenoid valve 35, in order to return this fluid to the brake 100 via the pilot-controlled valve 20 and the solenoid valve 21, thereby increasing the pressure in this brake which exerts a resistant torque on the wheel to counteract the engine torque, before the latter causes the wheel to skid on the road. When the pressure increase attributable to the pump becomes too high, the non-return discharge valve 36 opens, this valve being calibrated so as to open, for example, at a pressure of the order of 130 to 150 bars. This avoids damaging the circuit and the pump.

An essential advantage of the circuit according to the invention is that the functioning of the second branch of the circuit feeding the brake 101 associated with a non-driving wheel is not disrupted by the functioning of the anti-skid device. In fact, because of the arrangement of the solenoid valve 35 in the first branch of the circuit and downstream of the junction point 6 of the two branches with the master cylinder, the tripping of the solenoid anti-skid valve 35 has no effect on the branch of the circuit controlling the braking of the left rear non-driving wheel. The driver can thus brake this rear wheel by pressing on the brake pedal, even if the anti-skid device is in operation: this being impossible with the brake circuit described in the above-mentioned U.S. Pat. No. 4,944,565. This possibility of braking the rear wheel under all circumstances enhances the safety of the vehicle when the latter is equipped with the brake circuit according to the present invention.

Moreover, the hostile environment experienced by the electrical components of a motor vehicle means that they can be subject to uncontrolled triggering. Thus, the solenoid anti-skid valve 35 can be energized accidentally as a result of a fault of electrical origin and not by means of the computer of the anti-skid device, as would occur during normal operation. If this solenoid valve is actuated accidentally, the pump 32 is not actuated by the computer. In such a situation, it is nevertheless desirable that the vehicle driver should be able to actuate the brakes by means of the pedal 3, because, as seen above, it is important that the driver should be able to act on the vehicle brakes under all circumstances. Thus, if the solenoid valve 35 is actuated, that is to say if the orifice a is closed off, the driver can still increase the pressure in the brakes by pressing on the pedal 3, because of the non-return valve 37 which then opens in order to convey brake fluid under pressure into the brake 100 via the chamber 24 of the pilot-controlled valve 20 and the solenoid valve 21 at rest. On the other hand, the driver can still act on the brake 101 of the left rear wheel which remains permanently connected to the master cylinder 1 by means of the line 5, via the pilot-controlled valve 8 and the solenoid valve 9.

Attention is drawn to the function of the non-return valve 38 which, during a controlled or accidental actuation of the solenoid anti-skid valve 35, prevents brake fluid coming from the master cylinder from flowing off into the low-pressure accumulator 18. This is important more especially in the event of an accidental triggering of the solenoid valve 35, since action on the brake pedal aimed at increasing the pressure in the wheel brakes would thereby be diminished as a result of the flow-off of some of the fluid expelled from the master cylinder towards the accumulator 18. This eliminates the response times attributable to the filling of the accumulator of the circuit of the above-mentioned U.S. Pat. No. 4,944,565, when the brake pedal is actuated while the solenoid anti-skid valve is accidentally actuated.

It thus emerges that the special arrangements of the solenoid anti-skid valve 35 and of the non-return valves 37 and 38 of the brake circuit according to the invention afford several advantages:

In the anti-skid sequence, the possibility of braking the rear non-driving wheel with a normal response time is preserved, the possibility of braking the rear wheel under all circumstances, especially in the event of the accidental triggering of the solenoid anti-skid valve, is preserved.

In this latter case, the braking of the rear wheel is completed by a braking of the front wheel because the brake 100 is put in communication with the master cylinder via the non-return valve 37.

Of course, the invention is not limited to the embodiment described and illustrated, which has been given only by way of example. In particular, although in this embodiment, it is clear that the vehicle has a front-wheel drive, it would just as easily be possible to adapt the circuit according to the invention to a brake circuit for a vehicle with rear-wheel drive. Furthermore, although the description of the circuit according to the invention dealt with a conventional "X"-type circuit, the invention could be put into practice in other well-known types of circuit, insofar as these comprise at least one circuit for controlling a brake associated with a driving wheel and a second brake associated with a non-driving wheel.

What we claim is:

1. A hydraulic brake circuit for a motor vehicle, equipped with an anti-lock device and with an anti-skid device for wheels, this circuit comprising:

a master cylinder controlled by a brake pedal, first and second branches connected to the master cylinder for feeding brake fluid to first and second brakes associated respectively with a driving wheel and with a free wheel, each branch comprising a solenoid relief valve, by means of which the master cylinder normally communicates with the associated brake, an actuation of the respective solenoid relief valve under control of the anti-lock device putting the brake in communication with brake-fluid storage means, a pump actuated selectively by means of the anti-lock device in order to deliver brake fluid to the brakes, a solenoid anti-skid valve, placed downstream of a junction point of the two branches of the circuit with the master cylinder, in the branch feeding the driving-wheel brake and upstream of the solenoid respective relief valve, in order, when de-energized, to establish communication between the master cylinder and the driving-wheel brake via the respective solenoid relief valve, and upon the detection of imminent skidding of the driving wheel the anti-skid device actuating the pump and the solenoid anti-skid valve in order to break communication between the master cylinder and driving-wheel brake and connect an inlet of the pump to the master cylinder, in such a way that the pump delivers brake fluid coming from the pump to the driving-wheel brake, via the respective solenoid relief valve, so as to brake the driving wheel until the risk of slipping of the wheel has disappeared.

2. The circuit according to claim 1, further comprising a non-return valve placed between an inlet of the pump and the storage means in order to prevent the storage means from being filled with brake fluid coming from the master cylinder, in the event of braking controlled by the brake pedal simultaneously with one of the functioning of the anti-skid device and an accidental triggering of the solenoid anti-skid valve.

3. The circuit according to claim 1 further comprising a non-return valve placed in parallel with the solenoid anti-skid valve, to prevent the pump from delivering brake fluid to the master cylinder when the solenoid anti-skid valve is actuated by means of the anti-skid device, and to allow the driving-wheel brake to be put under pressure by the brake pedal during accidental actuation of the solenoid valve.

4. The circuit according to claim 1, wherein said first and second branches of the circuit comprise respective pilot-controlled valves which command the actuation of restrictions between the pilot controlled valves and the solenoid relief valves respectively, during operating sequences of the anti-lock device.

5. The circuit according to claim 4, wherein a restriction is placed between an outlet of the pump and one pilot-controlled valve for the purpose of filtering reactions on the brake pedal during operating sequences of the anti-lock device.

6. The circuit according to claim 4, further comprising a calibrated non-return valve between an inlet of the solenoid anti-skid valve connected to the junction point and one pilot-controlled valve communicating with an outlet of the pump, in order to limit the pressure of the fluid delivered by the pump to a predetermined value.

7. The circuit according to claim 1, further comprising a non-return valve placed at an outlet of the pump to prevent brake fluid from returning to the pump when the first branch is put under pressure as a result of action on the brake pedal.

8. The circuit according to claim 7, wherein a high-pressure accumulator is placed at the outlet of the pump between the pump and the non-return valve.

* * * * *